United States Patent Office 3,102,465
Patented Sept. 3, 1963

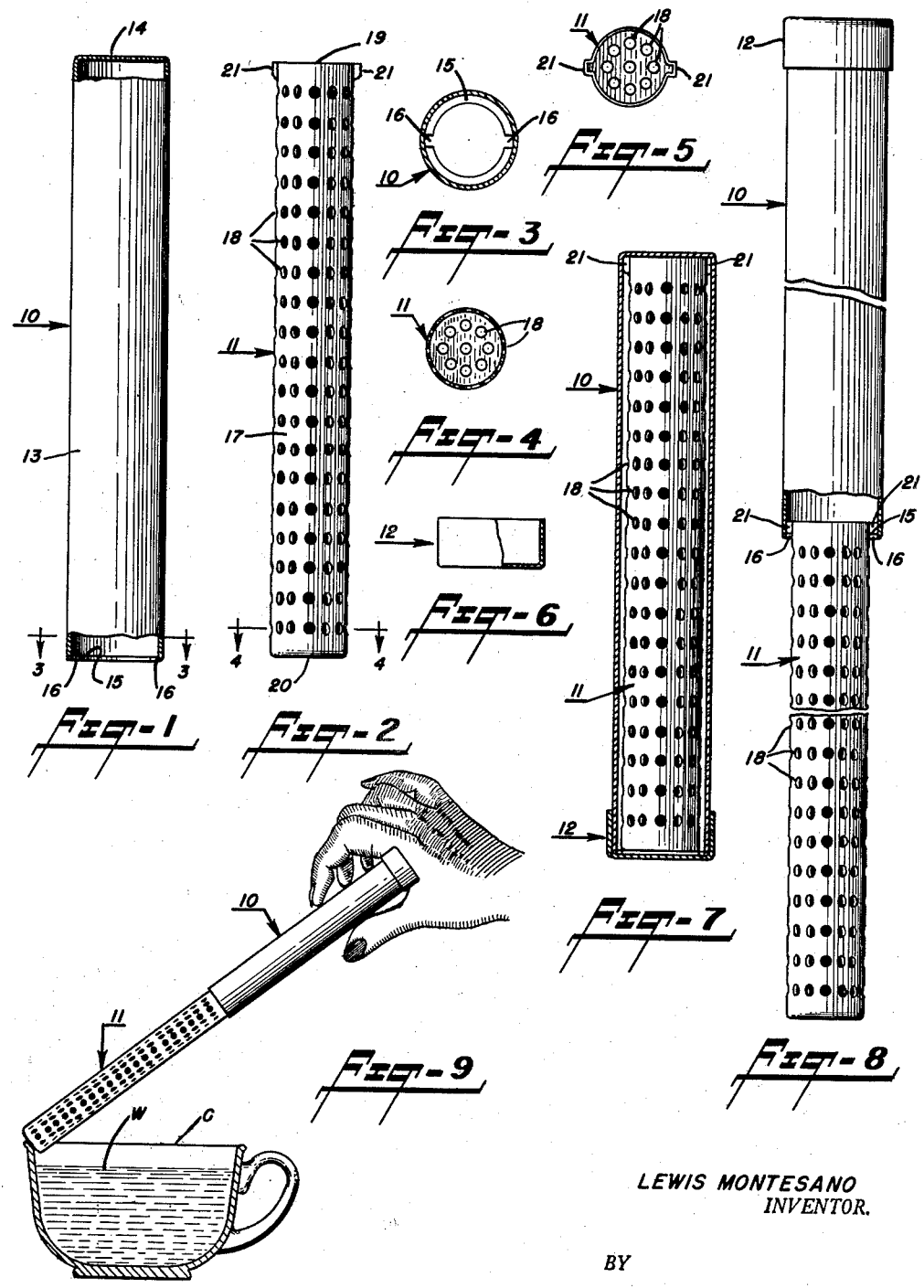

3,102,465
LEAK-PROOF PACKAGING INFUSION UNIT
Lewis Montesano, 57 Wildwood Ave.,
Upper Montclair, N.J.
Filed Apr. 16, 1962, Ser. No. 187,770
2 Claims. (Cl. 99—323)

This invention relates in general to infusion devices and has particular reference to small hand-operated devices which may be used to immerse a charge of dry tea or other desired food product in a vessel, such as a teacup, containing boiling water for steeping action in the preparation of a beverage.

The primary object of my invention is to provide a device of this kind which is more efficient, tidy and sanitary than the teabags now commonly in use.

To be more explicit, my improved infusion device comprises a telescopically arranged pair of tubular elements. One of these elements has perforated walls and is intended to hold one or more cup-yielding charges of tea or other infusion ingredient. The cooperative element is of larger diameter than the infusion charge holding element just described and has impervious walls adapting it for service as a leak-proof sheath element to enclose and package the said charge holding element for storage before and after an infusion operation. One end of the sheath element is closed permanently and the other end may be closed by a sealing cap element when the infusion charge holding element is completely retracted into the former in packaging condition. When an infusion operation is to be performed, the sheath element is uncapped and the infusion charge holding element is caused to protrude for insertion into a teacup or other vessel containing boiling water. In this operation, the sheath element serves as a handle and both elements combine to form a handy stirring rod.

I am aware of a similar infusion device in the prior art, but it has certain disadvantages. There are two telescoping tubular elements of which one is perforated to hold plural infusion charges, but the imperforate element fits slidably inside the perforated element to function as a plunger to discharge already steeped refuse tea leaves, or the like, from the outer end of the holder element and to feed a fresh charge into position for a succeeding infusion. Due to this construction, the infusion charges are always exposed to the atmosphere and, following an infusion operation, any liquid remaining in the perforated charge holding element can leak out in an untidy, objectionable manner. Thus, the prior art device is not capable of conversion into a sanitary, sealed packaging unit like mine.

Another object of the invention is to provide a telescopic infusion unit in which the mated sheath and charge holding elements are freely relatively slidable and will automatically gravitate into either of their respective extended or collapsed positions when appropriately inverted, but cannot accidentally become completely detached from each other, due to the provision of stop means which, however, can be adjusted to permit ready intentional detachment.

The above stated and other objects will become apparent from a reading of the following description of an illustrative embodiment of this invention in connection with the accompanying drawings thereof, in which drawings:

FIG. 1 is a side elevational view of the outer sheath element with both ends shown partially in vertical section;

FIG. 2 is a side elevational view of the perforated infusion charge holding element;

FIG. 3 is a horizontal section taken on line 3—3 in FIG. 1, showing the slotted ledge at the open end of the sheath element;

FIG. 4 is a similar view taken on line 4—4 in FIG. 2, showing the perforations in the bottom or outer end of the infusion charge holding element;

FIG. 5 is a plan view of the open upper end of the infusion charge holding element, showing the outturned lugs which rest upon the inturned ledge of the sheath element in the fully extended position of the said charge holding element and may be forced through the slots in said ledge to separate both elements;

FIG. 6 is a side elevation, partially in vertical section, of the snap-cap;

FIG. 7 is a vertical sectional view of the assembled elements, showing the lower end of the sheath element closed by the snap-on cap;

FIG. 8 is a fragmentary side elevational view of the assembled elements with the sheath element partially in vertical section, showing the infusion charge holding element fully extended and the snap-on cap stored on the upper end of the sheath element; and FIG. 9 is a side elevational view of the assembled elements and a cup (in vertical section) with beverage contents, showing the method of closing the unit after use.

Like characters of reference are applied in the above described views of the infusion device of this invention to indicate corresponding parts thereof.

Referring now in detail to the drawings, it will be observed that the complete packaging and infusion unit comprises three cooperative elements, viz: a tubular sheath element 10 of circular cross-section; a tubular infusion charge holding element 11 also of circular cross-section but of smaller diameter than sheath element 10 and thus adapted to fit telescopically inside the latter for relative rotary and longitudinal sliding movement; and a circular closure cap element 12 dimensioned for a tight snap-on fit over either end of sheath element 10. All three elements may be made of thin sheet metal or plastic material for continuous use, or may be made of paper or like material for disposable temporary use.

Sheath element 10 has an impervious side wall 13 and an impervious cross wall 14 integral with said side wall in closing relation to one end of said element. The end of sheath element 10 opposite to the end closed by cross wall 14 is open and has an inturned stop ledge 15 which is provided with preferably two diametrically opposed axial slots 16—16 (FIGS. 1 and 3). The inside diameter of ledge 15 is dimensioned to fit over infusion charge holding element 11 with sufficient clearance to permit free gravitational sliding movement of said holding element axially with respect to sheath element 10 whenever the latter is inverted in vertically extending position.

Infusion charge holding element 11 has its side wall 17 provided with plural perforations 18 of a diameter designed to retain food particles of the size of tea leaves, ground coffee, etc. One end of infusion charge holding element 11 is open as at 19 and the opposite end is closed by a cross wall 20, which is also perforated.

Diametrically opposed radially outturned stop lugs 21—21 are formed by suitable process on the open end of infusion charge holding element 11. The outside diameter of stop lugs 21—21 is such that they will fit inside sheath element 10 with sufficient clearance to permit the free gravitational axial sliding movement to which reference has already been made. The tangential width of stop lugs 21—21 is such that their side edges will have a forced fit with the corresponding side edges of the respective slots 16—16 of stop ledge 15 in sheath element 10, so that infusion charge holding element 11 will always be supported by stop ledge 15 when permitted to gravitate into contact with said ledge even though lugs 21—21 happen to register with slots 16—16. It is only when it is desired to separate elements 10 and 11 that lugs 21—21 are forced through slots 16—16 against the resistance of close clearances by exertion of manual pressure.

Although tea has been mentioned as an example of a common infusion ingredient, it is to be understood that my improved infusion device is highly suitable for use in the brewing of numerous beverages or non-beverage mixtures. Moreover, an infinite variety of supplementary ingredients may be added to the principal charge in infusion charge holder 11. For example, if a tea drinker likes sugar and lemon with his tea, soluble capsules containing these supplementary ingredients may be inserted in the charge of tea. If milk or cream is desired, especially in connection with instant coffee as the principal ingredient, powdered milk or cream may be added. Water soluble liners (not shown) can be prepared to fit inside the infusion charge holding elements 11 to more effectively contain finely comminuted ingredients, such as sugar and powdered cream. Tissue paper could be used as the liner material.

*Operation*

When explaining the mode of operation of my combined packaging and infusion device, its use in the infusion of tea will be assumed for simplicity.

With infusion charge holding element 11 detached from sheath element 10 and held in upright position as shown in FIG. 2, the charge of tea is loaded through open end 19 of said holding element. Then, the open end 19 of infusion charge holding element 11 is aligned with the open end of sheath element 10 and stop lugs 21—21 are made to register with stop slots 16—16 of stop ledge 15, by relative rotation of said elements 10 and 11, and are forced inward through said slots. When infusion charge holding element 11 has been thrust inwardly until completely contained in sheath element 10, sealing cap 12 is snapped onto the open end of said sheath element. In this way, the complete infusion unit is placed in packaging condition for shipment and storage.

Now, when it is desired to prepare a cup of tea, the complete unit 10—11 is held in the upright position shown in FIG. 7, using sheath element 10 as a handle, and cap 12 is detached from the lower, open end of said sheath element and then snapped onto the upper end of the latter for safekeeping. When this is done, perforated infusion charge holding element 11 will drop freely into the protruding position shown in FIG. 8, wherein stop lugs 21—21 are resting upon stop ledge 15 of sheath element 10.

The entire unit 10—11 is adapted to serve as a stirrer, so, still using sheath element 10 as a handle, infusion charge holding element 11 is immersed in the boiling water contents W of a suitable vessel, such as teacup C (FIG. 9) and is stirred until the color of the water indicates that the infusion with tea has produced the desired beverage strength. Now, the free end of infusion charge holding element 11 is rested on the rim of cup C in the position shown in FIG. 9 and sheath element 10 is thrust downward until the said element 11 is completely retracted into the said element 10. At this moment, the unit 10—11 is quickly inverted to allow the open upper end of infusion charge holding element 11 to drop into supported contact with the closed end of sheath element 10, whereupon cap 12 is detached from its safekeeping position and is snapped onto the open end of said sheath element to close and seal the same and thereby convert the device into its packaging condition represented in FIG. 7. In this condition no liquid from the soaked tea charge can leak out of the package.

While the invention has been illustrated and described with respect to a single embodiment thereof, it will be understood that it is intended to cover all changes and modifications of the embodiment shown which do not constitute departures from the spirit of the invention and scope of the appended claims.

Having now described my invention, I claim:

1. A combination packaging and infusion unit comprising: a cylindrical packaging sheath element having an impervious side wall and an impervious wall closing one end thereof in integral relation to said side wall, the opposite end of said sheath element being open; removable closure means for the open end of the sheath element; a cylindrical perforated infusion charge holding element dimensioned to fit telescopically slidably in said sheath element and having its inner end open and its outer end closed, said infusion charge holding element being adapted to be completely withdrawn into the interior of said sheath element in stored position and to protrude from the open end thereof in infusing position and stop means provided on the inner end of the infusion charge holding element and on the outer end of the sheath element to check protrusion of said infusion charge holding element, said stop means including an inturned stop member on the sheath element and an outturned stop member on the infusion charge holding element, one of the stop members being an annular ledge having at least one axial slot therein and the other stop member being at least one lug adapted to be moved through said ledge slot when rotated into axial registration therewith, the said slot and lug being dimensioned for a forced fit between the corresponding side edges thereof.

2. The invention defined in claim 1, wherein the radial clearance between both of said elements is sufficient to permit free gravitation of the infusion charge holding element to a bottom position in which the stop means contact each other when the sheath element is inverted.

References Cited in the file of this patent

UNITED STATES PATENTS

| | | |
|---|---|---|
| 790,626 | French | May 23, 1904 |
| 984,352 | Costello | Feb. 14, 1911 |
| 1,931,765 | Leever | Oct. 24, 1933 |
| 2,529,079 | Greene | Nov. 7, 1950 |
| 2,763,395 | Meek | Sept. 18, 1956 |